(12) United States Patent
Bitterfeld et al.

(10) Patent No.: US 10,938,657 B1
(45) Date of Patent: Mar. 2, 2021

(54) ENHANCING DISCOVERY PATTERNS WITH SHELL COMMAND EXIT STATUS

(71) Applicant: ServiceNow, Inc., Santa Clara, CA (US)

(72) Inventors: Robert Bitterfeld, Petach Tikva (IL); Asaf Garty, Sdei Hemed (IL); Bary Solomon, Petah Tikva (IL); Daniel Badyan, Tel Aviv (IL)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 16/570,514

(22) Filed: Sep. 13, 2019

(51) Int. Cl.
*G06F 15/16* (2006.01)
*H04L 12/24* (2006.01)
*H04L 29/08* (2006.01)
*G06F 9/455* (2018.01)
*H04L 12/923* (2013.01)

(52) U.S. Cl.
CPC ...... *H04L 41/0853* (2013.01); *G06F 9/45512* (2013.01); *H04L 41/04* (2013.01); *H04L 41/069* (2013.01); *H04L 41/0816* (2013.01); *H04L 47/762* (2013.01); *H04L 67/1097* (2013.01); *H04L 67/16* (2013.01)

(58) Field of Classification Search
CPC .................................................. H04L 41/0853
USPC ........................................................ 709/220
See application file for complete search history.

(56) References Cited

U.S. PATENT DOCUMENTS

| | | |
|---|---|---|
| 5,978,594 A | 11/1999 | Bonnell |
| 6,321,229 B1 | 11/2001 | Goldman |
| 6,816,898 B1 | 11/2004 | Scarpellil |
| 6,895,586 B1 | 5/2005 | Brasher |
| 7,027,411 B1 | 4/2006 | Pulsipher |
| 7,392,300 B2 | 6/2008 | Anantharangachar |
| 7,617,073 B2 | 11/2009 | Trinon |
| 7,877,783 B1 | 1/2011 | Cline |
| 7,945,860 B2 | 5/2011 | Vambenepe |
| 7,987,455 B1 * | 7/2011 | Senner ................ G06F 9/45512 717/136 |
| 8,554,750 B2 | 10/2013 | Rangaranjan |
| 10,169,127 B2 * | 1/2019 | Anderson ............... G06F 9/451 |
| 10,333,789 B1 * | 6/2019 | Dippenaar .............. H04L 67/18 |
| 10,528,414 B2 * | 1/2020 | Tomlin ................ G06F 11/0787 |
| 2011/0276977 A1 * | 11/2011 | van Velzen ........... G06F 9/5083 718/104 |

(Continued)

*Primary Examiner* — Hamza N Algibhah
(74) *Attorney, Agent, or Firm* — Fletcher Yoder, P.C.

(57) ABSTRACT

A computing system includes a discovery application that identifies a computing device associated with a managed network. The application determines a first command that causes the computing device to invoke a function that provides as output attributes of the computing device. The command includes a parameter that suppresses any textual error messages that the function places in the output. The application also determines a second command that causes the computing device to provide a numerical exit status of the function. The application causes the computing device to execute the first and second commands, and obtains the output and the numerical exit status. Based on the numerical exit status, the application determines that the function did not fully obtain the attributes of the computing device and, in response, (i) modifies the first command, and (ii) causes the computing device to execute the first command as modified and the second command.

20 Claims, 12 Drawing Sheets

(56) References Cited

U.S. PATENT DOCUMENTS

| | | | |
|---|---|---|---|
| 2014/0207919 A1* | 7/2014 | Kowalski | H04L 41/0896 709/220 |
| 2015/0089274 A1* | 3/2015 | Mares | H04L 51/04 714/4.11 |
| 2015/0254121 A1* | 9/2015 | Anderson | G06F 9/45512 714/37 |
| 2020/0081700 A1* | 3/2020 | Zhao | G06F 8/65 |
| 2020/0328912 A1* | 10/2020 | Hou | H04L 47/2441 |

* cited by examiner

700 → discovery_app@comp_dev: [First Command] [Command Parameters]
701 → [First Command Output] [First Command Textual Error Message]

702 → discovery_app@comp_dev: [First Command] [Command Parameters] 2> /dev/null
703 → [First Command Output]
704 → discovery_app@comp_dev: echo $?
705 → [Numerical Exit Status]

706 → discovery_app@comp_dev: [Modified First Command] [Command Parameters]
707 → 2> /dev/null
708 → [Updated First Command Output]
709 → discovery_app@comp_dev: echo $?
710 → [Updated Numerical Exit Status]

FIG. 7A

```
720 → discovery_app@comp_dev: fdisk -l
721 → fdisk: cannot open /dev/sda: Permission denied
722 → fdisk: cannot open /dev/sdb: Permission denied 723 → discovery_app@comp_dev: fdisk -l 2> /dev/null
724 →
725 → discovery_app@comp_dev: echo $?
726 → 2

728 → discovery_app@comp_dev: sudo fdisk -l 2> /dev/null
729 → Disk /dev/sda: 500 GB, ...
730 → ...
731 → Disk /dev/sdb: 305 GB, ...
732 → ...
733 → discovery_app@comp_dev: echo $?
734 → 0
```

FIG. 7B

ENHANCING DISCOVERY PATTERNS WITH SHELL COMMAND EXIT STATUS

BACKGROUND

Computing devices, software applications, storage structures, and other computing resources that make up a computer network may be discovered and the relationships therebetween may be mapped. Representations of these elements of the computer network, as well as the relationships, may be stored as configuration items in a database. The stored configuration items may later be retrieved and used to generate a visualization of a state or arrangement of these elements within the computer network, or used for other purposes. Discovering computing resources involves developing software processes that are capable of gathering the information needed for detection, classification, and/or identification of these computing resources.

SUMMARY

A discovery application may be configured to discover and generate a map of computing resources associated with a managed network. In some cases, the discovery application may discover and map a computing device disposed within the managed network by utilizing built-in functions provided by the computing device. For example, the discovery application may use an operating system shell of the computing device to collect information about the computing device to be included within the map. Such a discovery process may be referred to as agentless discovery because little to no software may be installed on the computing device to allow for execution of the discovery process.

Functions of the operating system shell may, however, generate errors for a plurality of reasons, resulting in the requested information not being fully obtained. In one example, the discovery application might lack permissions to execute certain functions and/or access certain files. In another example, some functions might not be installed on the computing device and thus might not be invokable by the discovery application. In a further example, one implementation of a function may take as input a different set of parameters than another implementation of the function provided on a different computing device.

The functions may be configured to generate textual error messages to indicate the cause of the error. The discovery application may thus use such textual error messages to determine the cause of the error and adjust the command used to obtain the requested information. The textual error messages may, however, vary across operating systems, operating system versions, and/or individual installations of an operating system (e.g., due to custom, one-off modifications). Such numerous variants of the textual error messages may make detection and handling of errors difficult. For example, the discovery patterns executed by the discovery application may need to be configured to handle each of these variants so that the discovery application can be used in a plurality of different computing environments. Further, as new variants of the error messages arise, the discovery patterns may need to be frequently updated to keep up with such changes.

In cases where the discovery application is not configured to handle a particular variant of a textual error message, the textual error message may be mistaken for valid output of the function. That is, the textual error message may be erroneously treated as an attribute of the computing device undergoing discovery, resulting in the textual error message, rather than a valid attribute, being incorporated into the map of computing resources. Further, when a textual error message is accurately determined to indicate an error, rather than valid output, it may nevertheless be difficult to determine the type of error based on the message. Specifically, determining the type of error may involve parsing the textual error message and extracting therefrom semantic information indicative of error type. However, due to the variability in the formatting and content of such error messages, it may be difficult to accurately determine the type of error indicated by the message.

Thus, the discovery application may be configured to suppress textual error messages and rely instead on a numerical exit status of the invoked function. To that end, the discovery application may be configured to generate at least two commands. A first command may be configured to invoke the function by way of which the attributes of the computing device are to be obtained. The first command may include a parameter configured to suppress any textual error messages, thus ensuring that any generated output does not contain error messages. The first command may also include other parameters, such as input flags and input values for obtaining particular attributes. A second command may be configured to obtain a numerical exit status of the function invoked by the first command. That is, the discovery application may obtain a numerical return value of the function in place of any textual error messages.

The numerical exit status may be a more accurate indicator of errors for the discovery application because it is a number, rather than text, and thus needs not be parsed. For example, by convention any non-zero numerical exit status may indicate an error. Additionally, a given numerical exit status may be more consistent across operating systems and operating system versions than textual output. For example, a relationship between (i) the numerical exit status and (ii) error type may be defined by a standard, convention, or recommendation provided by a software system, group, or consortium and implemented across different operating systems. Thus, fewer variants of the numerical exit status may need to be handled by the discovery application, since fewer variants are possible, thereby allowing the discovery application to be configured to make modifications to the discovery operations to resolve the encountered error. Further, since the numerical exit status is obtained as a result of execution of a second command, the numerical exit status is not comingled with valid output of the function invoked by the first command. Thus, the discovery application may easily avoid misinterpreting the numerical exit status as an attribute of the computing device undergoing discovery.

Accordingly, a first example embodiment may involve identifying, by a discovery application, a computing device associated with a managed network for incorporation into a representation of computing resources associated with the managed network. The representation may be stored, as one or more configuration items and on behalf of the managed network, in persistent storage disposed within a remote network management platform. The first example embodiment may also involve determining, by the discovery application, a first command configured to cause the computing device to invoke a function configured to provide as output one or more attributes of the computing device. The command may include a parameter that suppresses any textual error messages that the function places in the output in response to its execution. The first example embodiment may additionally involve determining, by the discovery application, a second command configured to cause the computing device to provide a numerical exit status of the function. The first example embodiment may further involve causing, by the discovery application, the computing device to execute the first command and the second command, and then obtaining, from the computing device and by the discovery application, the output of the function and the numerical exit status of the function. The first example embodiment may yet additionally involve, based on the numerical exit status of the function, determining, by the discovery application, that the function did not fully obtain the one or more attributes of the computing device. The first example embodiment may yet further involve, in response to determining that the function did not fully obtain the one or more attributes of the computing device, (i) modifying, by the discovery application, the first command, and (ii) causing, by the discovery application, the computing device to execute the first command as modified and the second command.

In a second example embodiment, a computing system may include persistent storage disposed within a remote network management platform and configured to store, as one or more configuration items and on behalf of a managed network, a representation of computing resources associated with the managed network. The computing system may also include a discovery application configured to perform operations. The operations may include identifying a computing device associated with the managed network for incorporation into the representation. The operations may also include determining a first command configured to cause the computing device to invoke a function configured to provide as output one or more attributes of the computing device. The command may include a parameter that suppresses any textual error messages that the function places in the output in response to its execution. The operations may additionally include determining a second command configured to cause the computing device to provide a numerical exit status of the function. The operations may further include causing the computing device to execute the first command and the second command, and then obtaining, from the computing device, the output of the function and the numerical exit status of the function. The operations may yet additionally include, based on the numerical exit status of the function, determining that the function did not fully obtain the one or more attributes of the computing device. The operations may yet further include, in response to determining that the function did not fully obtain the one or more attributes of the computing device, (i) modifying the first command, and (ii) causing the computing device to execute the first command as modified and the second command.

In a third example embodiment, an article of manufacture may include a non-transitory computer-readable medium, having stored thereon program instructions that, upon execution by a computing system, cause the computing system to perform operations in accordance with the first example embodiment and/or the second example embodiment.

In a fourth example embodiment, a computing system may include at least one processor, as well as memory and program instructions. The program instructions may be stored in the memory, and upon execution by the at least one processor, cause the computing system to perform operations in accordance with the first example embodiment and/or the second example embodiment.

In a fifth example embodiment, a system may include various means for carrying out each of the operations of the first example embodiment and/or the second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIGS. 7A and 7B depict example operating system shell instructions, in accordance with example embodiments.

DETAILED DESCRIPTION

Figure 1:
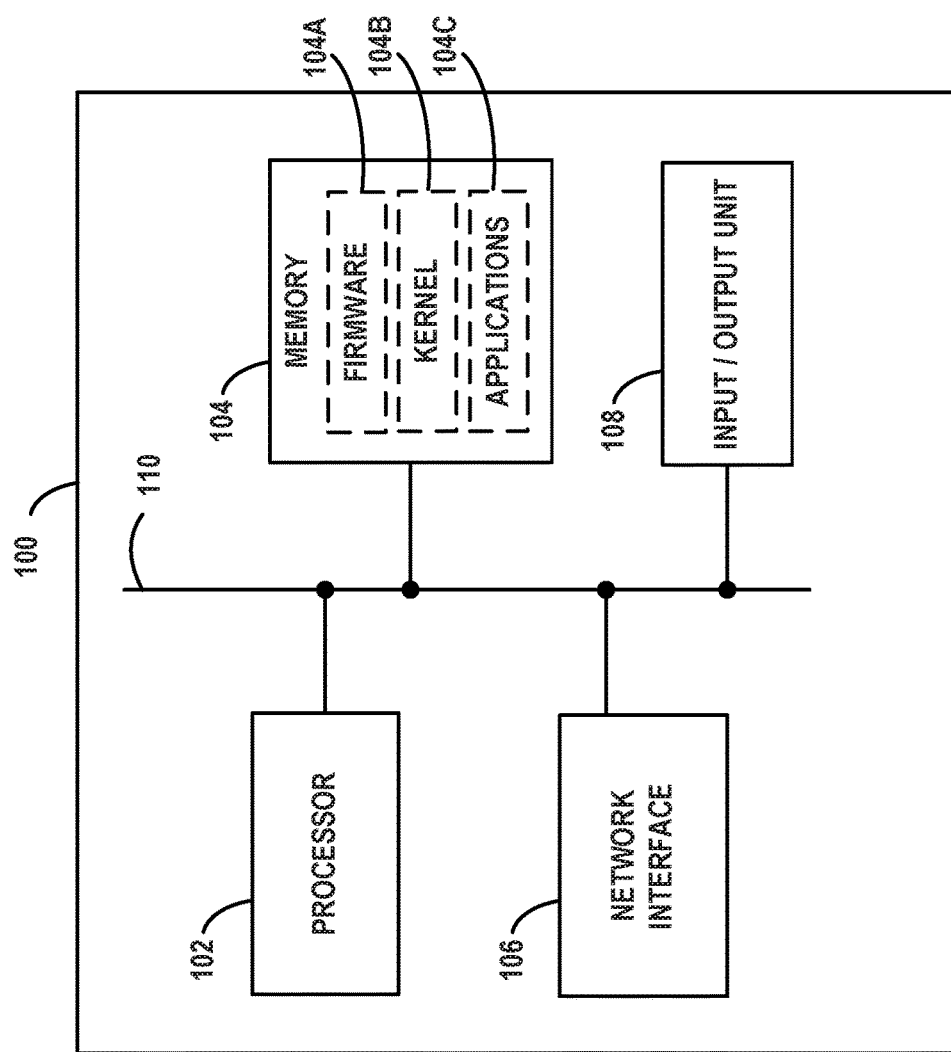
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HTML and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation"

thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
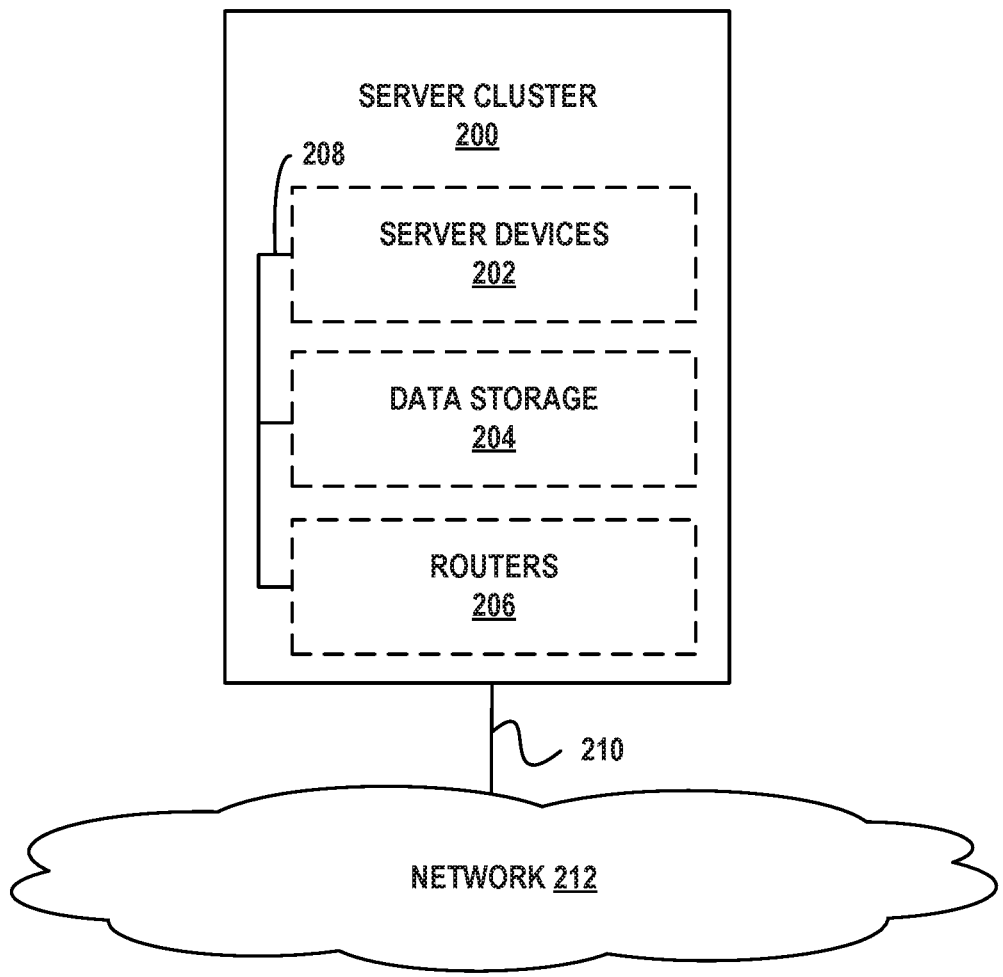
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. Example Remote Network Management Architecture

Figure 3:
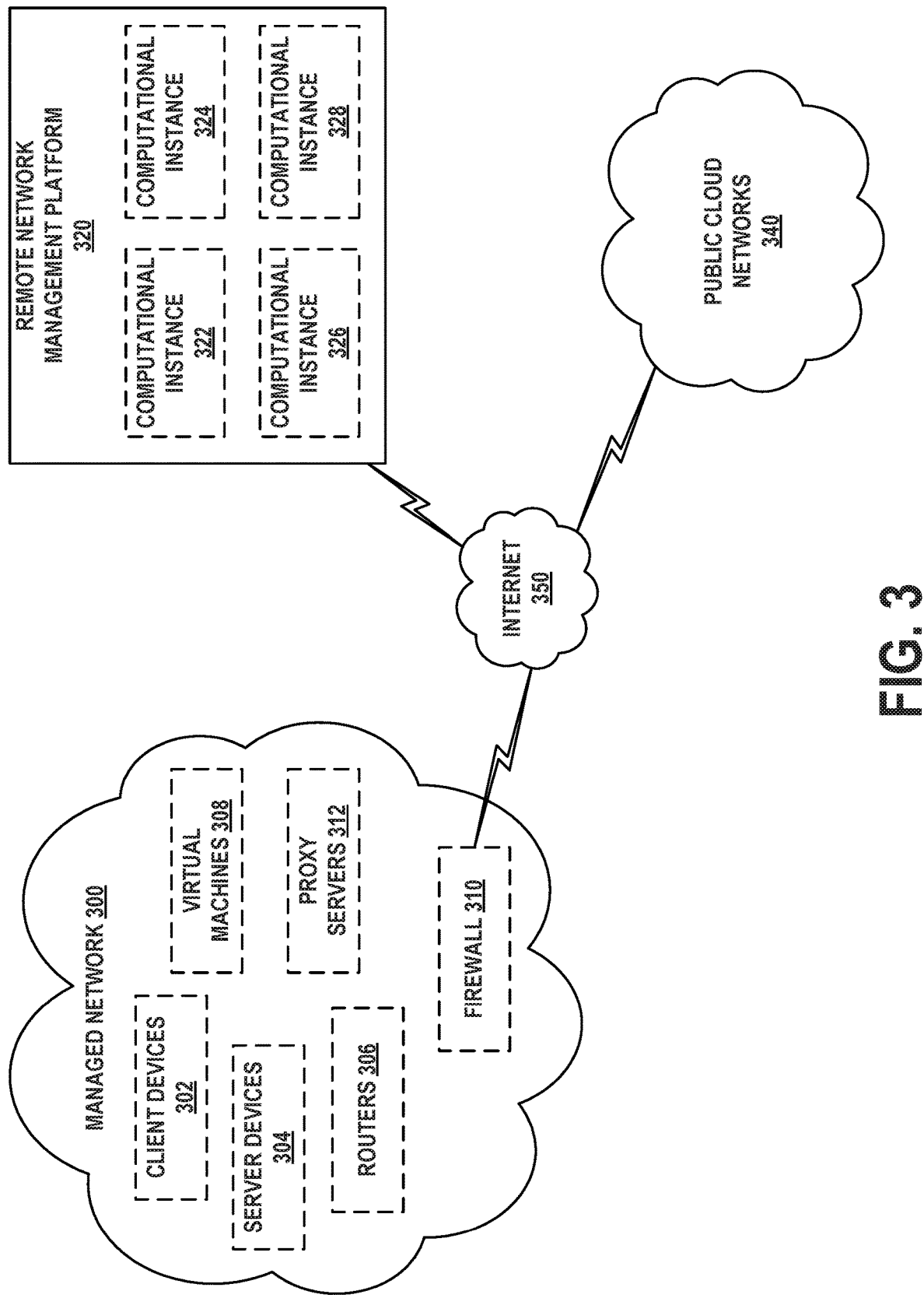
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of public cloud networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
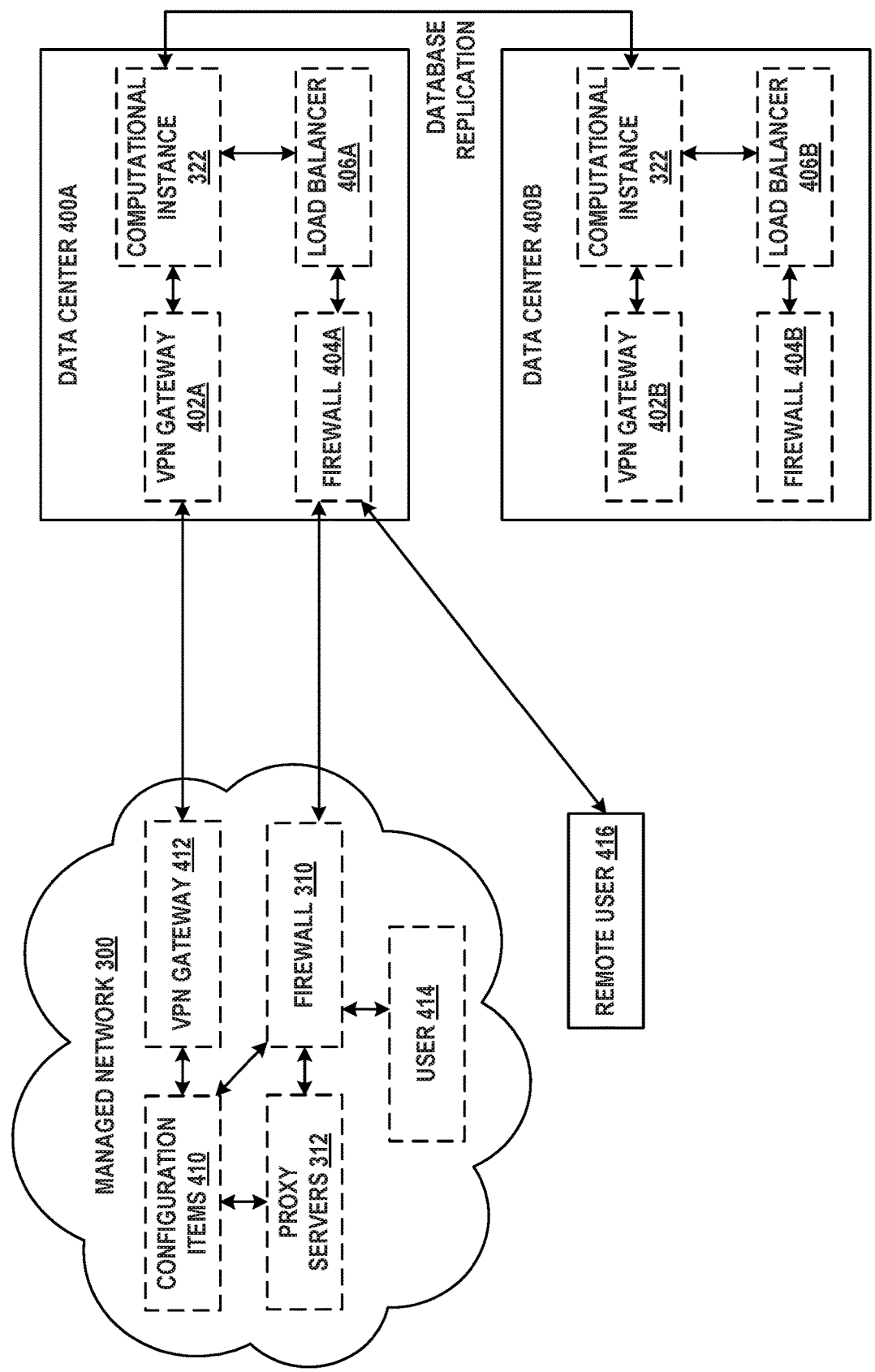
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, as well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purposes of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
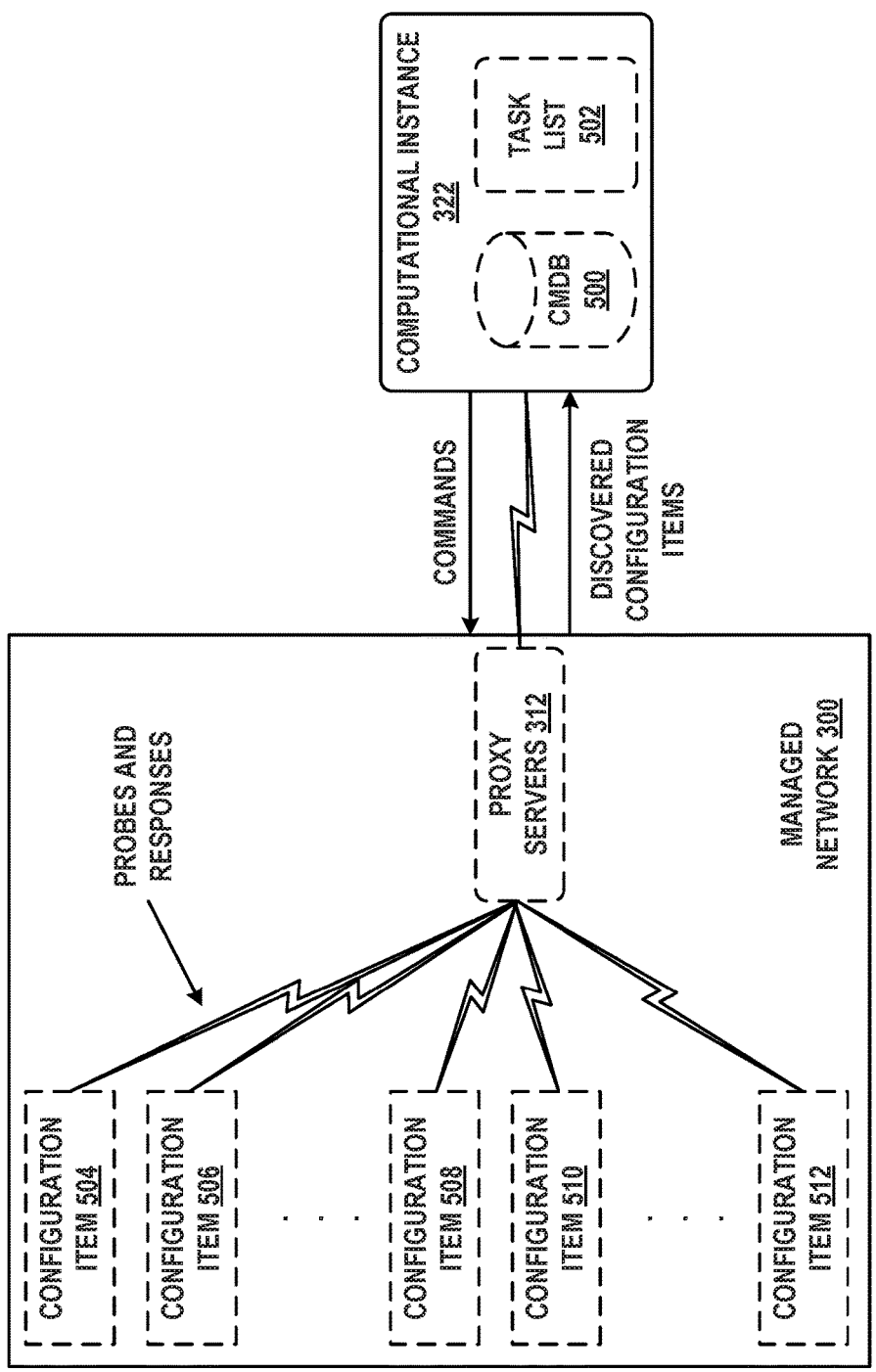
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, public cloud networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address (es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration, and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For example, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
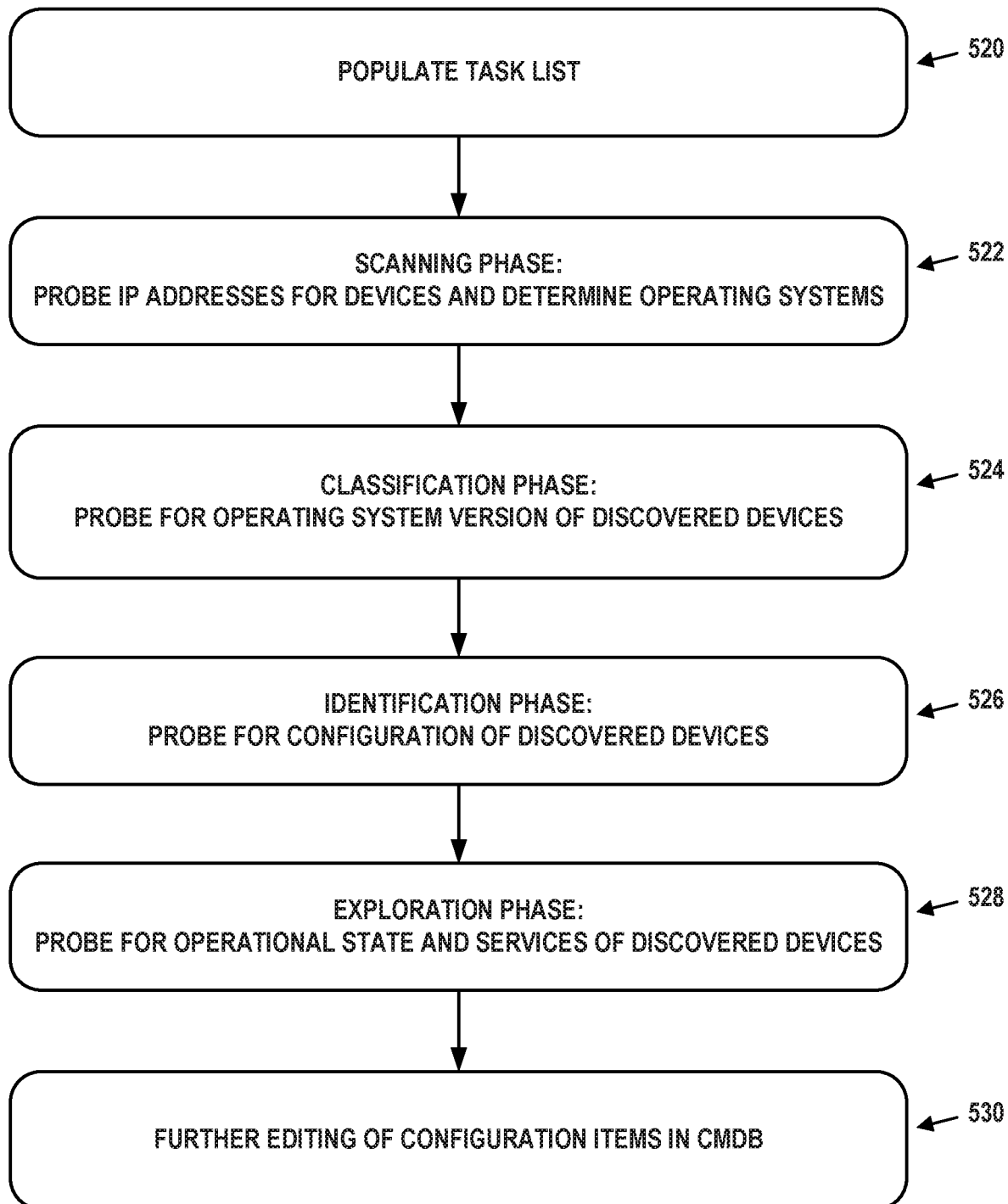
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are examples. Discovery may be a highly configurable procedure that can have more or fewer phases, and the operations of each phase may vary. In some cases, one or more phases may be customized, or may otherwise deviate from the exemplary descriptions above.

In this manner, a remote network management platform may discover and inventory the hardware, software, and services deployed on and provided by the managed network. As noted above, this data may be stored in a CMDB of the associated computational instance as configuration items. For example, individual hardware components (e.g., computing devices, virtual servers, databases, routers, etc.) may be represented as hardware configuration items, while the applications installed and/or executing thereon may be represented as software configuration items.

The relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

The relationship between a service and one or more software configuration items may also take various forms. As an example, a web service may include a web server software configuration item and a database application software configuration item, each installed on different hardware configuration items. The web service may have a "depends on" relationship with both of these software configuration items, while the software configuration items have a "used by" reciprocal relationship with the web service. Services might not be able to be fully determined by discovery procedures, and instead may rely on service mapping (e.g., probing configuration files and/or carrying out network traffic analysis to determine service level relationships between configuration items) and possibly some extent of manual configuration.

Regardless of how relationship information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

V. Example Discovery Process Utilizing Command Exit Status

Figure 6A:
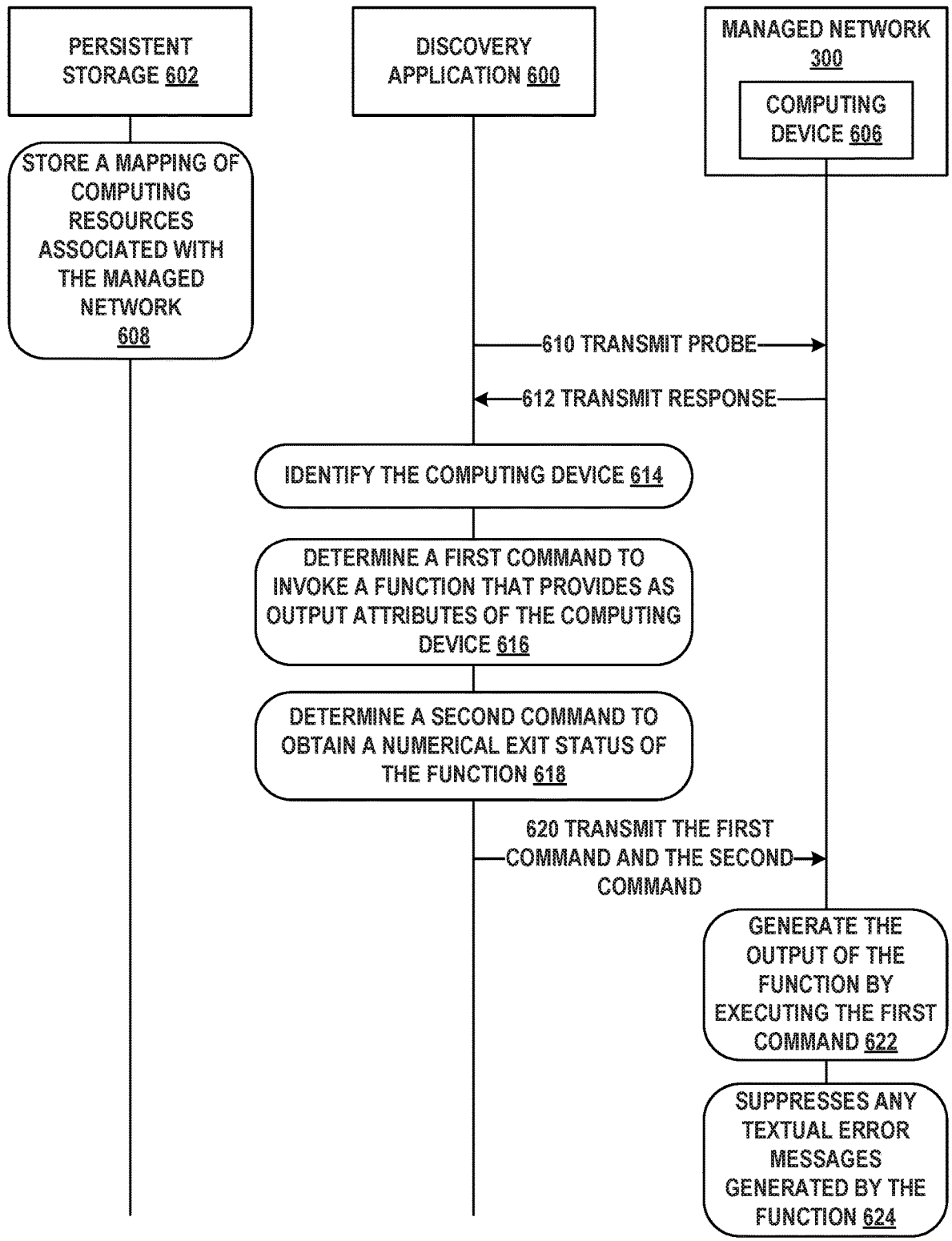
FIGS. 6A, 6B, and 6C illustrate a message flow diagram, in accordance with example embodiments.
Figure 6B:
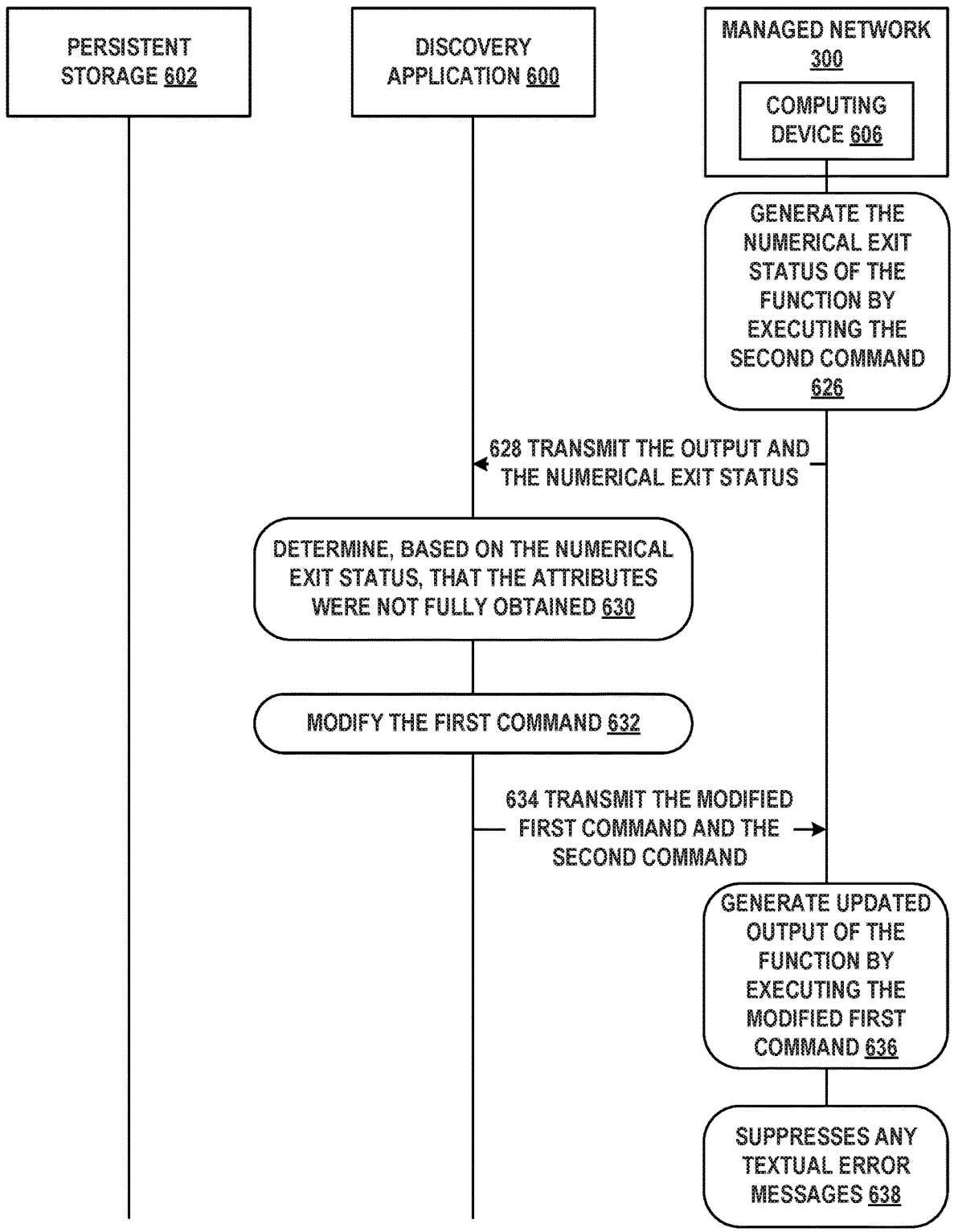
Figure 6C:
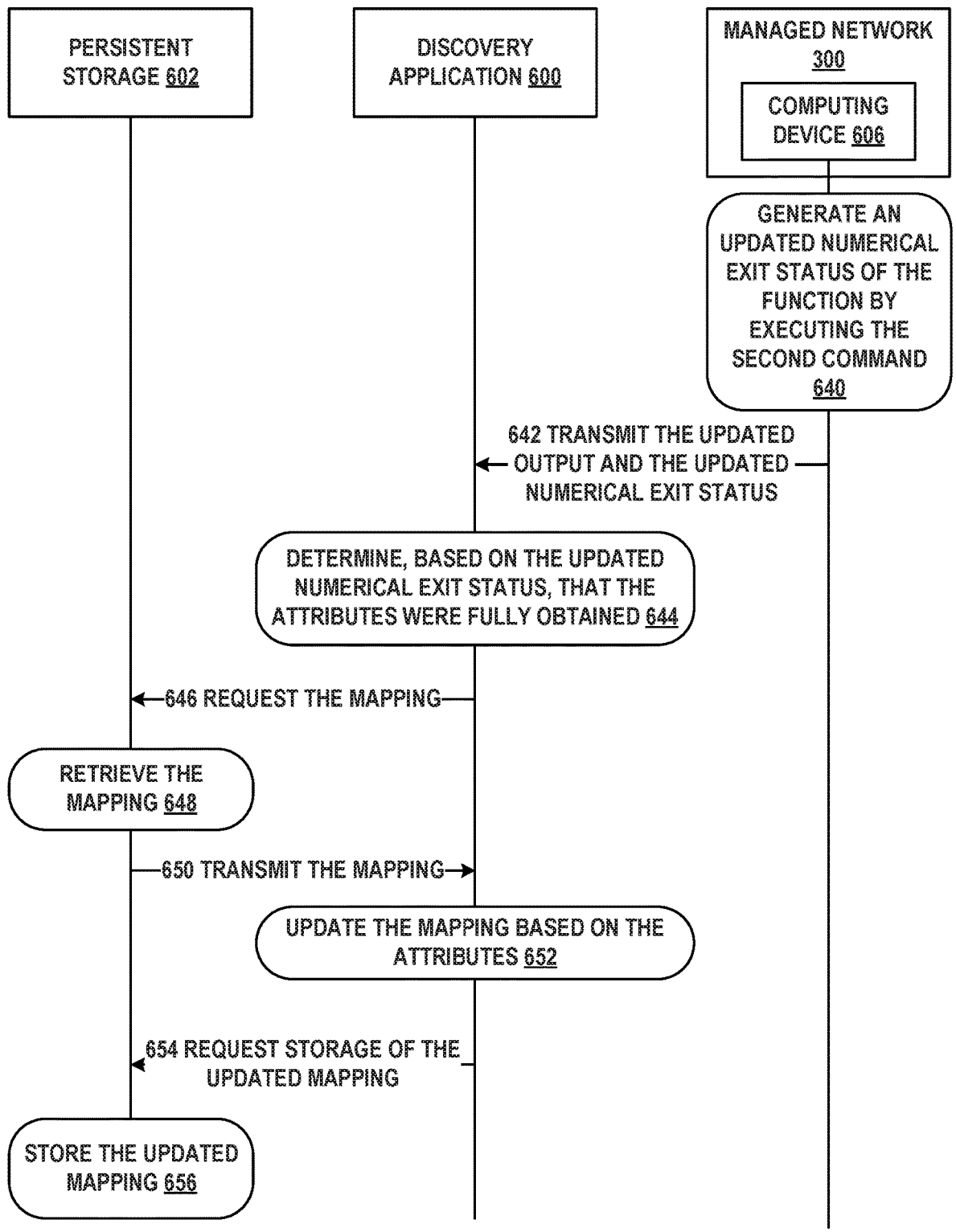

FIGS. 6A, 6B, and 6C illustrate message flow diagrams of operations involved in discovering and mapping elements of a managed network. Specifically, FIGS. 6A, 6B, and 6C illustrate discovery application 600, persistent storage 602, and computing device 606 contained in managed network 300. Persistent storage 602 may, in some implementations, include and/or take the form of a database. In one implementation, discovery application 600 and persistent storage 602 may be disposed in or form part of a computational instance (e.g., computational instance 322) of remote network management platform 320. This computational instance may be assigned to managed network 300, and thus used to discover, map, and/or adjust various computing resources associated therewith. In other implementations, portions of discovery application 600 may be disposed in, form part of, or be executed with the assistance of proxy servers 312. For example, some or all portions of a discovery pattern deployed by discovery application 600 may be executed by proxy servers 312.

Persistent storage 602 may be configured to store a mapping of computing resources associated with managed network 300, as indicated by block 608. The mapping may represent a plurality of computing devices associated with managed network 300, and the interconnections between these computing devices, among other information. The mapping may be stored in persistent storage 602 as configuration items, which may be retrieved from persistent storage 602 by various computing devices and used to generate a visualization of the mapping. Discovery application 600 may be configured to generate the mapping and modify the mapping over time as the state of managed network 300 changes. Other uses of configuration items beyond that of visualization have been described above.

To that end, discovery application 600 may discover and map additional computing devices present within managed network 300. For example, discovery application 600 may initiate the discovery and mapping process for computing device 606 by transmitting, to managed network 300 and/or computing device 606, a discovery probe, as indicated by arrow 610. Based on or in response to reception of the probe at arrow 610, managed network 300 and/or computing device 606 may transmit a response, as indicated by arrow 612, that identifies computing device 606. Thus, based on or in response to reception of the response at arrow 612, discovery application 600 may be configured to identify computing device 606 for incorporation into the mapping, as indicate by block 614.

In some cases, the probe of arrow 610 may be transmitted to computing device 606 based on an indicia of computing device 606 being discovered on another computing device within managed network 300. For example, attributes of another computing device within managed network 300 may indicate that this other computing device is communicatively connected to computing device 606. Computing device 606 may thus be discovered and identified based on its connections with such other computing devices within managed network 300.

With computing device 606 identified, discovery application 600 may be configured to obtain additional details regarding computing device 606. Thus, based on or in response to identifying computing device 606 at block 614, discovery application 600 may be configured to determine a first command to be executed by computing device 606. The first command may be configured to cause computing device 606 to invoke a function that provides as output one or more attributes of computing device 606.

The function may be, for example, a function of an operating system shell of computing device 606. The function may be determined based on an operating system of computing device 606, which may be indicated in the response at arrow 612. For example, the function used for a WINDOWS®-based operating system may be different from the function used for a LINUX®-based operating system. To obtain information about storage drives used by a computing device executing a WINDOWS®-based operating system, discovery application 600 may be configured to use the "diskpart" function. On the other hand, to obtain similar information for a computing device executing a LINUX®-based operating system, discovery application 600 may be configured to use the "fdisk" function.

The attributes of computing device 606 generated by the function may include any information relevant to the discovery and mapping of computing device 606. For example, the attributes may include an amount of storage available to computing device 606, network parameters of computing device 606, software programs installed on computing device 606, and/or an amount of computing resources available on computing device 606, among other possibilities. Each set of attributes may be associated with and/or obtainable by way of a different function.

In some cases, the function may fail to fully obtain the requested attributes. Such failure may be indicated by way of a textual error message generated by the function and placed in the output thereof. In some cases, the function may generate some of the attributes, and this partial output may be provided along with the textual error messages. For example, the function may be configured to provide its output to a standard output channel (e.g., stdout) of the operating system and provide any error messages to a standard error channel (e.g., stderr) of the operating system. Both the standard output channel and the standard error channel may be provided as output of the operating system shell, and may thus be difficult to distinguish from one another. This difficulty in distinguishing the function's valid output from the function's error messages may result in the error messages being misinterpreted as valid output of the function (i.e., as the attributes).

Further, due to variability among operating systems, operating system versions/releases/flavors, and/or implementations of the functions, the content and formatting of the textual error messages may vary. This variability may result in discovery application 600 not being able to interpret the error message, and thus not being able to adjust the first command accordingly to fully obtain the attributes.

Accordingly, the first command may include therein a parameter that suppresses any textual error messages that the function places in the output in response to its execution. The format of this parameter may depend on the operating system of computing device 606. In the case of LINUX®-based operating systems, the parameter may be, for example, "2> /dev/null", where "2" is a channel descriptor of the standard error channel, ">" indicates to redirect contents of the preceding channel descriptor to the following file descriptor, and "/dev/null" is a file descriptor/path of a file system object that discards anything written thereto. In some implementations, "/dev/null" may be replaced, for example, by a file descriptor/path of a log file that stores the error messages written thereto for later analysis. In the case of WINDOWS®-based operating systems, the parameter may be, for example, "2> nul", where "nul" is analogous to "/dev/null."

Rather than relying on textual error messages, discovery application 600 may be configured to rely on a numerical exit status of the function in determining whether the requested attributes were fully obtained. To that end, discovery application 600 may be configured to determine a second command configured to cause computing device 606 to provide a numerical exit status of the function, as indicated by block 618. The operations of block 618 may be carried out based on or in response to completion of the operations of block 614 and/or 616.

Like the first command, the second command may be based on the operating system and/or the operating system shell of computing device 606. In the case of a LINUX®-based operating system, the second command may be, for example, "echo $?", where echo is an operating system command configured to write its arguments to the standard output channel, and "$?" contains the return value of the last executed command. In the case of a WINDOWS®-based operating system, the second command may be, for example, "echo % errorlevel %", where "% errorlevel %" contains the return value of the last executed command. Thus, in some implementations, the first command and the second command may be executed sequentially and without any other commands executed therebetween so as not to override the return value of the function invoked by the first command.

Based on or in response to determining the first command at block 616 and/or determining the second command at block 618, discovery application 600 may be configured to transmit the first command and the second command to computing device 606, as indicated by arrow 620. This and other transmissions between discovery application 600 and computing device 606 may be carried out by way of an SSH or POWERSHELL® connection established therebetween.

Based on or in response to reception of the first command and/or the second command at arrow 620, computing device 606 may be configured to generate the output of the function by executing the first command, as indicated by block 622. Specifically, the first command may invoke execution of the function, which may in turn generate as output all, some, or none of the attributes. Based on the parameter included in the first command, computing device 606 may be configured to suppress any textual error messages generated by the function, as indicated by block 624. Instead of providing these textual messages, computing device 606 may be configured to generate the numerical exit status of the function by executing the second command, as indicated by block 626 of FIG. 6B. That is, computing device 606 may be configured to generate a numerical output, rather than a textual output, to indicate whether the function executed successfully or encountered any errors.

Based on or in response to generating the output at block 622 and/or generating the numerical exit status at block 626, computing device 606 may be configured to transmit, to discovery application 600, the output and the numerical exit status, as indicate by arrow 628. Based on or in response to reception of the output and the numerical exit status at arrow 628, discovery application 600 may be configured to determine that the attributes were not fully obtained, as indicated by block 630. The determination at block 630 may involve determining that the function generated some, but not all, of the attributes specified by the first command, or that the function did not generate any of these attributes (e.g., the function did not execute or failed for some reason).

Notably, both the textual error message and the numerical exit status may indicate that the attributes were not fully obtained. The numerical exit status may, however, be easier to interpret than the textual error message. That is, interpreting the numerical exit status does not involve parsing text and extracting meaning therefrom. Instead, for example, determining that the function did not fully obtain the attributes may involve determining that the numerical exit status is not equal to a predetermined value. Further, the numerical exit status may be more consistent across different computing devices than the textual error message. That is, a particular exit status may indicate the same type of error across different operating systems, while this same error may be indicated textually in a plurality of different ways across different operating systems or versions thereof.

Based on or in response to determining, at block 630, that the attributes were not fully obtained, discovery application 600 may be configured to modify the first command, as indicated by block 632. In some implementations, the first command may be modified based on the numerical exit status of the function. That is, the numerical exit status of the function may indicate a type of error encountered in executing the function, and the first command may thus be adjusted to avoid or correct this type of error. For example, the first command may be modified by determining a third command as an alternative to the first command. The third command may, for example, invoke a different function than the first command. This different function may be configured to provide as output at least some of the attributes initially expected to be obtained by way of the first command. In another example, the first command may be modified by adjusting one or more additional parameters included in the first command. The one or more additional parameters may specify an input for the function, such as an input value and/or an input flag that specifies a manner in which the function is to execute. Other modifications may be possible.

Based on or in response to modifying the first command at block 632, discovery application 600 may be configured to transmit, to computing device 606, the modified first command and the second command for execution. That is, discovery application 600 may be configured to re-attempt to obtain the attributes of computing device 606 by way of the modified first command.

Based on or in response to reception of the commands at arrow 634, computing device 606 may be configured to generate an updated output of the function invoked by the modified first command by executing the first command as modified, as indicated by block 636. Again, computing device 606 may be configured to suppress any textual error messages based on the parameter included in the first command, as indicated by block 638. Further, computing device 606 may be configured to generate an updated numerical exit status of the function invoked by the modified first command by executing the second command, as indicated by block 640. Based on or in response to generation of the updated output at block 636 and/or generation of the updated numerical exit status at block 640, computing device 606 may be configured to transmit, to discovery application 600, the updated output and the updated numerical exit status, as indicated by arrow 642.

Based on or in response to reception of the updated output and the updated numerical exit status, discovery application 600 may be configured to determine, based on the updated numerical exit status, that the attributes were fully obtained, as indicated by block 644. In some cases, computing device 606 may adhere to a convention defined by the Portable Operating System Interface (POSIX). For example, a numerical exit status of zero may indicate that the function executed successfully and without any errors, resulting in the output containing all the requested attributes. On the other hand, a non-zero numerical exit status may indicate that some error occurred.

The relationship or mapping between a particular non-zero value of the numerical exit status and a corresponding error may be defined, for example, based on a recommendation list defined by the GNU's Not Unix (GNU) or another software system, group, or consortium. This mapping may be shared and used across different operating systems and versions thereof. Thus, the type of error encountered during execution of the function may be accurately identified based on the numerical exit status. Accordingly, discovery application 600 may be configured to adjust the discovery operations (e.g., modify the first command) based on the numerical exit status, thereby allowing the discovery process to proceed without interruption by inconsistent textual error messages that discovery application 600 might not otherwise have been configured to handle.

The operations of arrow 634 through arrow 642 may be analogous to those of arrow 620 through arrow 628, respectively. Further, if the updated numerical exit status again indicates that the attributes were not fully obtained, discovery application 600 may be configured to further modify the first command and/or omit discovery of the attributes by way of the first command.

Based on or in response to determining that the attributes were fully obtained at block 644, discovery application 600 may be configured to request, from persistent storage 602, the mapping of the computing resources associated with managed network 300, as indicated by arrow 646. Based on or in response to reception of the request at arrow 646, persistent storage 602 may be configured to retrieve the mapping, as indicated by block 648. Based on or in response to retrieval of the mapping at block 648, persistent storage 602 may be configured to transmit the mapping to discovery application 600, as indicated by arrow 650.

Based on or in response to reception of the mapping at arrow 650, discovery application 600 may be configured to update the mapping based on the attributes, as indicated by block 652. For example, when computing device 606 is not indicated by the mapping, discovery application 600 may generate configuration items that represent computing device 606, its attributes, and any connections and/or relationships between computing device 606 and other computing devices within managed network 300, among other information. On the other hand, when computing device 606 is already present in the mapping, discovery application 600 may modify configuration items associated with computing device 606 to indicate any updates to its attributes and its connections and/or relationships with other computing devices within managed network 300, among other information.

Based on or in response to updating the mapping at block 652, discovery application 600 may be configured to request storage of the updated mapping in persistent storage 602, as indicated by arrow 654. Based on or in response to reception of the request at arrow 654, persistent storage 602 may be configured to store the mapping as updated by discovery application 600, as indicated by block 656.

VI. Example Operating System Shell Commands

FIGS. 7A and 7B illustrate example commands that may be provided to computing device 606 as part of the operations illustrated in FIGS. 6A, 6B, and 6C. The commands are shown provided to computing device 606 (i.e., comp_dev) by way of an operating system shell (i.e., an interface configured to allow command line access to an operating system's services). Notably, the instructions shown in FIGS. 7A and 7B correspond to an operating system shell of a LINUX® or a LINUX®-like operating system. As discussed above, different operating-system-specific instructions may be used to perform similar operations on different operating systems such as, for example, WINDOWS® or MACOS®.

The prompt "discovery_app@comp_dev" on line 700 indicates that computing device 606 is being remotely accessed by way of discovery application 600 (i.e., discovery_app). Although a graphical representation of the input and output of the operating system shell is shown in FIGS. 7A and 7B for illustrative purposes, such graphical representations might not be displayed in practice. Rather, the information shown graphically may be transmitted as text characters between computing device 606 and discovery application 600 by way of a network connection.

Lines 700 and 701 of FIG. 7A illustrate an implementation where a numerical exit status of the function is not utilized in place of the textual error messages. Brackets "H" are used in FIG. 7A to illustrate generic commands, outputs, and messages that, in practice, may be substituted with specific commands, outputs, and messages as illustrated, for example, in FIG. 7B. Specifically, line 700 indicates that discovery application 600 may provide command "First Command", which includes "Command Parameters", to computing device 606. In response or based thereon, computing device 606 may generate an output "First Command Output" and/or a textual error message "First Command Textual Error Message", as indicated by line 701. When both the output and the textual error message are provided, it may be difficult to determine where one ends and the other begins. Additionally, it may be difficult to determine the cause of the error based on the textual error message.

Accordingly, lines 702-710 illustrate an implementation that uses a numerical exit status in place of textual error messages. Namely, line 702 indicates that discovery application 600 appends parameter "2> /dev/null" to "First Command" and "Command Parameters". In response or based thereon, computing device 606 may generate the output "First Command Output", as indicated on line 703, and may suppress any textual error message (i.e., "First Command Textual Error Message" is not shown on line 703). Discovery application 600 may then cause computing device 606 to execute the second command "echo $?", as indicated on line 704, based on or in response to which computing device 606 may generate numerical exit status "Numerical Exit Status", as indicated on line 705.

When "Numerical Exit Status" indicates that the attributes were not fully obtained, "Modified First Command" may be executed, as indicated on lines 706 and 707, to obtain "Updated First Command Output", as indicated on line 708. Alternatively, the first command may be executed again with modified parameters. The second command "echo $?" may be re-executed, as indicated on line 709, to obtain the updated numerical exit status "Updated Numerical Exit Status", as indicated on line 710. In some implementations, the first and second commands may be concatenated and provided to computing device 606 as a single input, namely, "[First Command] [Command Parameters] 2> /dev/null; echo $?". The output of the first command and the numerical exit status may be disambiguated from one another on the basis of the numerical exit status being generated after the output of the first command.

FIG. 7B illustrates the process of FIG. 7A carried out with respect to the "fdisk" command. The "fdisk" command may be configured to identify storage devices connected to and/or used by computing device 606 along with attributes of these storage devices. Specifically, line 720 indicates that discovery application 600 may provide command "fdisk", which includes parameter (e.g., input flag) "−l", to computing device 606. In response or based thereon, computing device 606 may generate textual error messages "fdisk: cannot open /dev/sda: Permission denied" and "fdisk: cannot open /dev/sdb: Permission denied", as indicated by lines 721 and 722. These messages may indicate that discovery application 600 lacks permission to open the storage devices identified by the "fdisk" command, and that the attributes of these storage devices thus cannot be determined. In this example, "fdisk" has not produced any valid output. Due to the lack of standardization in these error messages, it may be difficult to determine whether these messages constitute valid output or indicate errors, and to identify the type of error encountered.

Accordingly, lines 723-734 illustrate an implementation that uses a numerical exit status of "fdisk" in place of textual error messages. Namely, line 723 indicates that discovery application 600 appends parameter "2> /dev/null" to "fdisk −l". In response or based thereon, computing device 606 might not generate any output, as indicated on line 724, and may suppress any textual error message (i.e., the messages from lines 721 and 722 are not shown on line 724). Discovery application 600 may then cause computing device 606 to execute the second command "echo $?", as indicated on line 725, based on or in response to which computing device 606 may generate numerical exit status "2", as indicated on line 726. Numerical exit status "2" may indicate a permissions-related error. The relationship between the numerical exit status and the type of error may be more consistent across computing devices, operating systems, operating system versions, and/or operating system shells than the textual error message, making the numerical exit status a more reliable basis for modifying the first command. This relationship may be determined (e.g., manually or automatically by discovery application 600) based on, for example, a manual page associated with the first command (e.g., the "fdisk" command).

When numerical exit status "2" is received by discovery application 600, indicating that the attributes were not fully obtained due to a lack of permissions, discovery application 600 may modify the "fdisk −l" command to "sudo fdisk −l", as indicated on line 728. The "sudo" command allows the "fdisk −l" command to be run with super user privileges, thus avoiding the previously-encountered error. Thus, computing device 606 may execute the "sudo fdisk −l 2> /dev/null" command to obtain the output indicated on lines 729-732. Specifically, lines 729 and 731 indicate that computing device 606 has access to two disks, the first disk (i.e. "/dev/sda") having a capacity of 500 GB and the second disk (i.e. "/dev/sdb") having a capacity of 305 GB. Lines 730 and 732 may indicate additional attributes of these disks. The second command "echo $?" may be re-executed, as indicated on line 733, to obtain the updated numerical exit status "0", as indicated on line 734, which now indicates that the requested attributes were fully obtained. That is, the "fdisk" function has been successfully executed and returned the requested attributes without any errors.

VII. Example Operations

Figure 8:
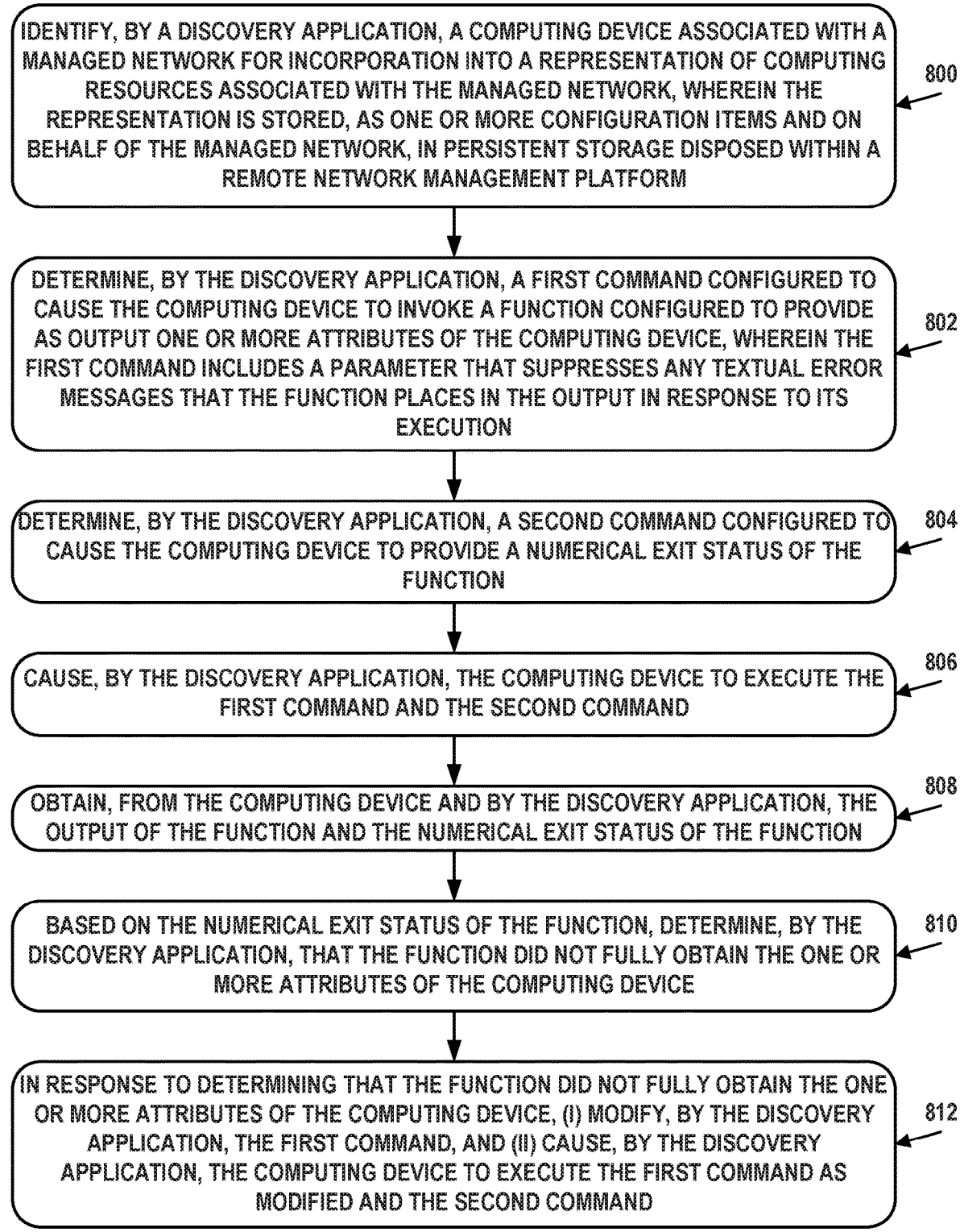
FIG. 8 is a flow chart, in accordance with example embodiments.

FIG. 8 is a flow chart illustrating an example embodiment. The process illustrated by FIG. 8 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 8 may be simplified by the removal of any one or more of the features shown therein. Further, these embodiments may be combined with features, aspects, and/or implementations of any of the previous figures or otherwise described herein.

Block 800 involves identifying, by a discovery application, a computing device associated with a managed network for incorporation into a representation of computing resources associated with the managed network. The representation may be stored, as one or more configuration items and on behalf of the managed network, in persistent storage disposed within a remote network management platform.

Block 802 involves determining, by the discovery application, a first command configured to cause the computing device to invoke a function configured to provide as output one or more attributes of the computing device. The command may include a parameter that suppresses any textual error messages that the function places in the output in response to its execution.

Block 804 includes determining, by the discovery application, a second command configured to cause the computing device to provide a numerical exit status of the function.

Block 806 includes causing, by the discovery application, the computing device to execute the first command and the second command.

Block 808 includes obtaining, from the computing device and by the discovery application, the output of the function and the numerical exit status of the function.

Block 810 includes, based on the numerical exit status of the function, determining, by the discovery application, that the function did not fully obtain the one or more attributes of the computing device.

Block 812 includes, in response to determining that the function did not fully obtain the one or more attributes of the computing device, (i) modifying, by the discovery application, the first command, and (ii) causing, by the discovery application, the computing device to execute the first command as modified and the second command.

In some embodiments, the discovery application may also be configured to obtain, from the computing device, an updated output of the function and an updated numerical exit status of the function. Based on the updated numerical exit status of the function, the discovery application may determine that the function obtained the one or more attributes of the computing device. Based on determining that the function obtained the one or more attributes of the computing device, the discovery application may update the representation of the computing resources associated with the managed network to include the one or more attributes of the computing device. The representation as updated may be stored in the persistent storage.

In some embodiments, the representation might not be updated when the numerical exit status of the function indicates that the function did not fully obtain the one or more attributes of the computing device.

In some embodiments, determining that the function did not fully obtain the one or more attributes of the computing device may include determining that the numerical exit status of the function is not equal to a predetermined value.

In some embodiments, the discovery application may be configured to determine that the output of the function is empty, and determine that the function did not fully obtain the one or more attributes of the computing device further based on determining that the output of the function is empty.

In some embodiments, modifying the first command may include modifying the first command based on the numerical exit status of the function.

In some embodiments, modifying the first command may include determining a third command configured to cause the computing device to invoke another function configured to provide as output at least some of the one or more attributes.

In some embodiments, the parameter may be a first parameter. Modifying the first command may include modifying a second parameter included in the first command. The second parameter may specify an input for the function.

In some embodiments, the first command may be modified based on a manual page associated with the first command.

In some embodiments, the discovery application may be configured to identify an operating system of the computing device and determine each of the first command and the second command based on the operating system of the computing device.

In some embodiments, each of the first command and the second command may include operating system shell commands.

In some embodiments, the parameter may be configured to cause the computing device to suppress the textual error messages generated by the function by redirecting a standard error channel to a file system object configured to discard data provided thereto.

In some embodiments, the second command may be configured to cause the computing device to provide the numerical exit status of the function by providing a value of a particular operating system shell variable to a standard output channel.

In some embodiments, the discovery application may be executed by a server device remote to the computing device to implement an agentless discovery process for the computing device.

VIII. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, or compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computing system comprising:
    persistent storage disposed within a remote network management platform and configured to store, as one or more configuration items and on behalf of a managed network, a representation of computing resources associated with the managed network; and
    a discovery application configured to perform operations comprising:
        identifying a computing device associated with the managed network for incorporation into the representation;
        determining a first command configured to cause the computing device to invoke a function configured to provide as output one or more attributes of the computing device, wherein the first command includes a parameter that suppresses any textual error messages that the function places in the output in response to its execution;
        determining a second command configured to cause the computing device to provide a numerical exit status of the function;
        causing the computing device to execute the first command and the second command;
        obtaining, from the computing device, the output of the function and the numerical exit status of the function;
        based on the numerical exit status of the function, determining that the function did not fully obtain the one or more attributes of the computing device; and
        in response to determining that the function did not fully obtain the one or more attributes of the computing device, (i) modifying the first command, and (ii) causing the computing device to execute the first command as modified and the second command.

2. The computing system of claim 1, wherein the operations further comprise:
    obtaining, from the computing device, an updated output of the function and an updated numerical exit status of the function;
    based on the updated numerical exit status of the function, determining that the function obtained the one or more attributes of the computing device;
    based on determining that the function obtained the one or more attributes of the computing device, updating the representation of the computing resources associated with the managed network to include the one or more attributes of the computing device; and
    storing, in the persistent storage, the representation as updated.

3. The computing system of claim 2, wherein the representation is not updated when the numerical exit status of the function indicates that the function did not fully obtain the one or more attributes of the computing device.

4. The computing system of claim 1, wherein determining that the function did not fully obtain the one or more attributes of the computing device comprises determining that the numerical exit status of the function is not equal to a predetermined value.

5. The computing system of claim 1, wherein the operations further comprise:
    determining that the output of the function is empty; and
    determining that the function did not fully obtain the one or more attributes of the computing device further based on determining that the output of the function is empty.

6. The computing system of claim 1, wherein modifying the first command comprises:
    modifying the first command based on the numerical exit status of the function.

7. The computing system of claim 1, wherein modifying the first command comprises:
    determining a third command configured to cause the computing device to invoke another function configured to provide as output at least some of the one or more attributes.

8. The computing system of claim 1, wherein the parameter is a first parameter, and wherein modifying the first command comprises:
    modifying a second parameter included in the first command, wherein the second parameter specifies an input for the function.

9. The computing system of claim 1, wherein the first command is modified based on a manual page associated with the first command.

10. The computing system of claim 1, wherein the operations further comprise:
    identifying an operating system of the computing device; and
    determining each of the first command and the second command based on the operating system of the computing device.

11. The computing system of claim 1, wherein each of the first command and the second command comprise operating system shell commands.

12. The computing system of claim 1, wherein the parameter is configured to cause the computing device to suppress the textual error messages generated by the function by redirecting a standard error channel to a file system object configured to discard data provided thereto.

13. The computing system of claim 1, wherein the second command is configured to cause the computing device to provide the numerical exit status of the function by providing a value of a particular operating system shell variable to a standard output channel.

14. The computing system of claim 1, wherein the discovery application is executed by a server device remote to the computing device to implement an agentless discovery process for the computing device.

15. A computer-implemented method comprising:
    identifying, by a discovery application, a computing device associated with a managed network for incorporation into a representation of computing resources associated with the managed network, wherein the representation is stored, as one or more configuration items and on behalf of the managed network, in persistent storage disposed within a remote network management platform;
    determining, by the discovery application, a first command configured to cause the computing device to invoke a function configured to provide as output one or more attributes of the computing device, wherein the first command includes a parameter that suppresses any textual error messages that the function places in the output in response to its execution;
    determining, by the discovery application, a second command configured to cause the computing device to provide a numerical exit status of the function;

causing, by the discovery application, the computing device to execute the first command and the second command;

obtaining, from the computing device and by the discovery application, the output of the function and the numerical exit status of the function;

based on the numerical exit status of the function, determining, by the discovery application, that the function did not fully obtain the one or more attributes of the computing device; and in response to determining that the function did not fully obtain the one or more attributes of the computing device, (i) modifying, by the discovery application, the first command, and (ii) causing, by the discovery application, the computing device to execute the first command as modified and the second command.

16. The computer-implemented method claim 15, further comprising:

obtaining, from the computing device, an updated output of the function and an updated numerical exit status of the function;

based on the updated numerical exit status of the function, determining that the function obtained the one or more attributes of the computing device;

based on determining that the function obtained the one or more attributes of the computing device, updating the representation of the computing resources associated with the managed network to include the one or more attributes of the computing device; and storing, in the persistent storage, the representation as updated.

17. The computer-implemented method claim 16, wherein the representation is not updated when the numerical exit status of the function indicates that the function did not fully obtain the one or more attributes of the computing device.

18. The computer-implemented method claim 15, wherein modifying the first command comprises:

determining a third command configured to cause the computing device to invoke another function configured to provide as output at least some of the one or more attributes.

19. The computer-implemented method claim 15, further comprising:

identifying an operating system of the computing device; and determining each of the first command and the second command based on the operating system of the computing device.

20. An article of manufacture including a non-transitory computer-readable medium, having stored thereon program instructions that, upon execution by a computing system, cause the computing system to perform operations comprising:

identifying a computing device associated with a managed network for incorporation into a representation of computing resources associated with the managed network, wherein the representation is stored, as one or more configuration items and on behalf of the managed network, in persistent storage disposed within a remote network management platform;

determining a first command configured to cause the computing device to invoke a function configured to provide as output one or more attributes of the computing device, wherein the first command includes a parameter that suppresses any textual error messages that the function places in the output in response to its execution;

determining a second command configured to cause the computing device to provide a numerical exit status of the function;

causing the computing device to execute the first command and the second command;

obtaining, from the computing device, the output of the function and the numerical exit status of the function;

based on the numerical exit status of the function, determining that the function did not fully obtain the one or more attributes of the computing device; and in response to determining that the function did not fully obtain the one or more attributes of the computing device, (i) modifying the first command, and (ii) causing the computing device to execute the first command as modified and the second command.

* * * * *